(No Model.)

J. T. JORDAN.
FREEZER.

No. 582,996. Patented May 18, 1897.

Witnesses
F. L. Ourand
J. Tappan

Inventor,
James T. Jordan,
by John Wedderburn
Attorney

THE NORRIS PETERS CO., PHOTO-LITHO., WASHINGTON, D. C.

UNITED STATES PATENT OFFICE.

JAMES T. JORDAN, OF HOUSTON, TEXAS, ASSIGNOR OF TWO-THIRDS TO JENNINGS M. MOORE AND J. C. VAUGHN, OF DALLAS, TEXAS.

FREEZER.

SPECIFICATION forming part of Letters Patent No. 582,996, dated May 18, 1897.

Application filed August 24, 1896. Serial No. 603,720. (No model.)

*To all whom it may concern:*

Be it known that I, JAMES T. JORDAN, a citizen of the United States, residing at Houston, in the county of Harris and State of Texas, have invented certain new and useful Improvements in Freezers; and I do hereby declare the following to be a full, clear, and exact description of the invention, such as will enable others skilled in the art to which it appertains to make and use the same.

My invention consists of a freezer for freezing liquids, confections, &c.

This invention consists of certain novel constructions, combinations, and arrangements of parts, all of which will be hereinafter more fully described and claimed.

The construction will be pointed out more particularly in the specification following, reference being had to the drawings accompanying and forming a part thereof, in which—

Figure 1:
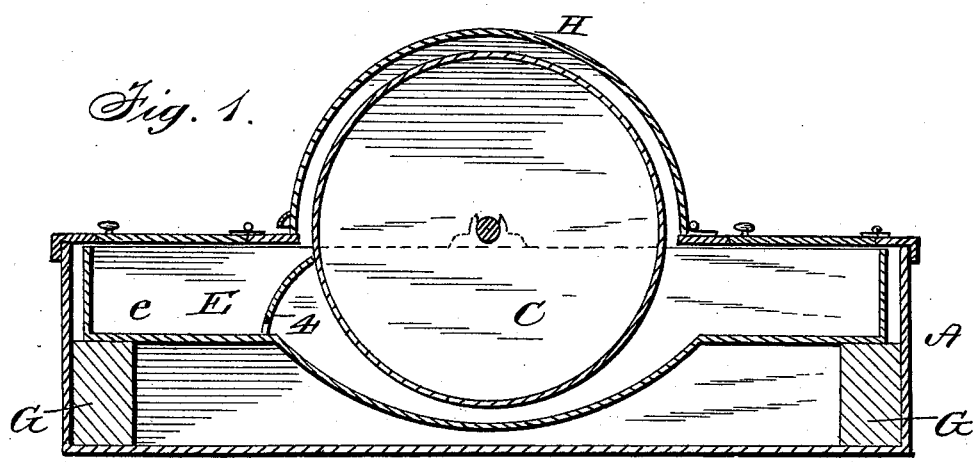
Figure 2:
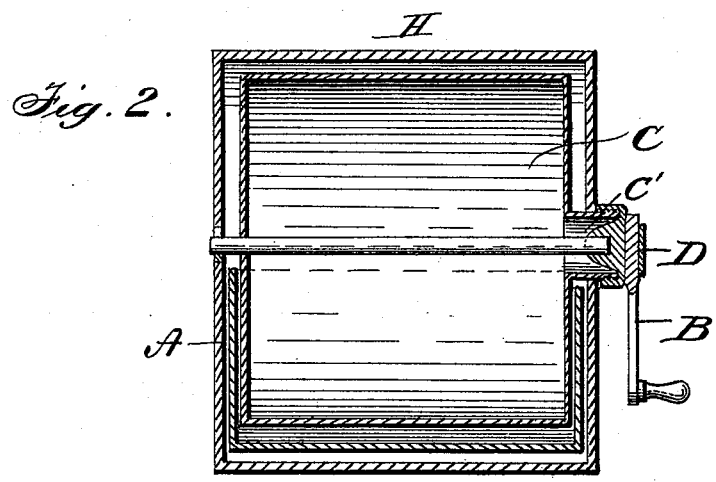
Figure 3:
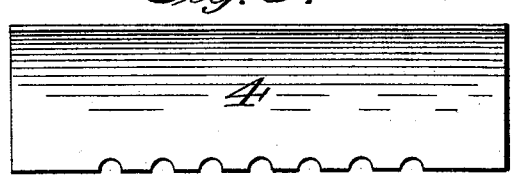

Figure 1 is a sectional elevation at right angles to the cylinder. Fig. 2 is a sectional elevation through the axis of the cylinder, and Fig. 3 is a detail of the scraper.

The object of my invention is to produce a freezer for ice-cream and other confections which may be used to freeze the cream in small quantities and as required. I accomplish this by the novel means herein described.

A rectangular case A is made of wood, metal, or suitable material and has mounted thereon the cylinder C. This cylinder, which contains the freezing chemicals or compounds, has an opening in one head, as C', through which the freezing compound is inserted. This head then screws or otherwise fastens down, so as to be tight and prevent leakage. The crank B is inserted in a staple D, fixed to this head, and the cylinder rotated thereby. Below the cylinder is placed a removable tank E. This tank embraces the lower portion of the cylinder, and has a scraper 4, consisting of a blade of metal, adapted to lightly scrape the outer surface of the cylinder when it is revolved.

The central portion of the tank E is made of a circular section, into which the lower surface of the cylinder C dips. The fluid to be frozen is to be placed in this circular portion. The lower portion of the cylinder dipped into this will take up a small part of the liquid and freeze the same as a thin layer. This layer when it comes in contact with the knife 4 will be removed and dropped into the receptacle e, back of the blade 4. The blade 4 at its lower edge is made notched, so that any of the frozen material which may melt after reaching the receptacle may run back directly into the tank, the bottom of the receptacle e being higher than the bottom of the tank. The tank e rests upon blocks G.

The tank may be moved horizontally upon these blocks, and in cases where very hard freezing is desired the tank may be moved, so that the scraper 4 is slightly removed from the cylinder C. As a consequence the liquid will be frozen upon the surface harder than if it were scraped off upon the first revolution. This would be impossible with any device not having means for the horizontal adjustment of the scraper. A cap H is hinged to the box A and covers the upper surface of the cylinder, which is made to turn up whenever desired and may also be utilized for filling the fluid-tank E.

Having thus described my invention, what I claim as new, and desire to secure by Letters Patent, is—

1. The combination with a freezing-cylinder, of a horizontally-movable pan having a central depression and end extensions above said depression, a scraping-blade fixed to the bottom of the pan at the edge of the depression, so as to leave a receptacle for frozen cream between it and the end of the pan, substantially as described.

2. The combination with a freezing-cylinder, of a horizontally-movable pan located below the same, and having an elevated frozen-cream receptacle, a scraper located at the forward end of said receptacle, and adapted to scrape the cream from the cylinder into said receptacle, substantially as described.

3. The combination with a freezing-cylinder, of a horizontally-movable pan having a central depression, an end extension above the said depression, and a scraping-blade fixed to the bottom of the pan at the edge of the depression, so as to leave a receptacle for the frozen cream behind it, and provided with a plurality of outlets at its lower edge whereby the melted cream may drain from the cream-receptacle into the depression, substantially as described.

4. The combination with a freezing-cylinder, of a horizontally-movable pan located below the same and having a central depression and elevated end extensions, a scraping-blade fixed to the bottom of the pan at one edge of the depression, so as to form a frozen-cream receptacle between it and the end of the pan, a casing adapted to inclose the cylinder and the pan, and doors located in said casing above the extensions of said pan, substantially as described.

In testimony whereof I have signed this specification in the presence of two subscribing witnesses.

JAMES T. JORDAN.

Witnesses:
   JNO. H. RULY,
   JAS. A. CARBARY.